No. 771,337. PATENTED OCT. 4, 1904.
J. THOMSON.
DISK WATER METER.
APPLICATION FILED OCT. 19, 1903.
NO MODEL. 4 SHEETS—SHEET 1.

Attest
A. N. Jesbera
Alfred W. Liddle

Inventor:
John Thomson
by Gidding Liddle Gurdy
Attys.

No. 771,337. PATENTED OCT. 4, 1904.
J. THOMSON.
DISK WATER METER.
APPLICATION FILED OCT. 19, 1903.
NO MODEL. 4 SHEETS—SHEET 2.
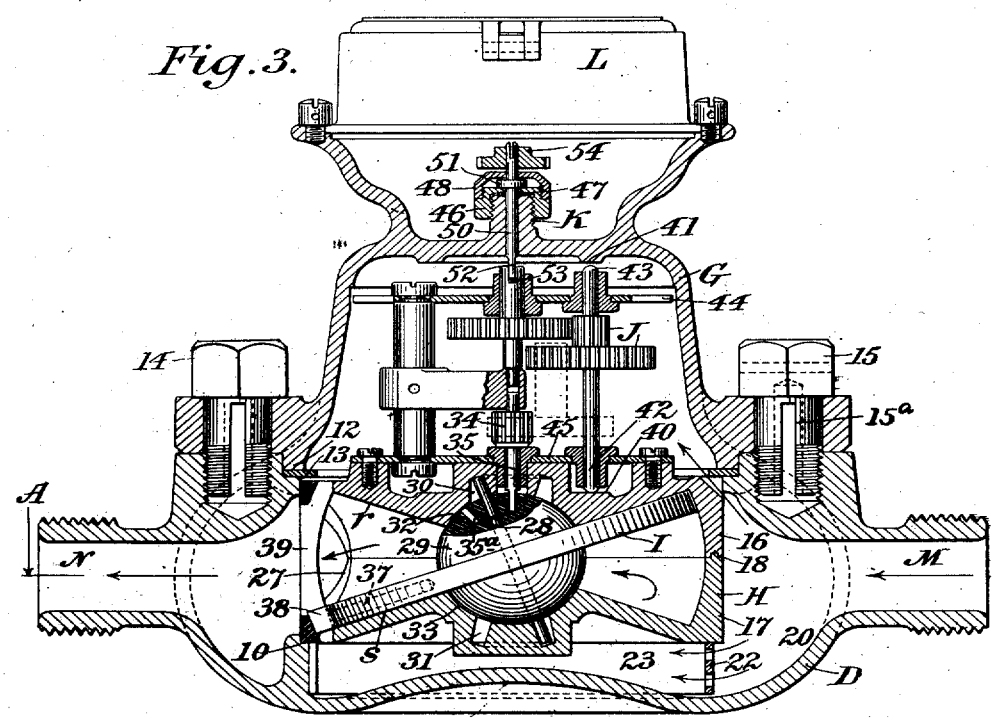
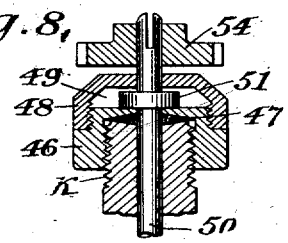

No. 771,337. PATENTED OCT. 4, 1904.
J. THOMSON.
DISK WATER METER.
APPLICATION FILED OCT. 19, 1903.
NO MODEL. 4 SHEETS—SHEET 3.

Attest:
A. N. Jesbera
Alfred W. Liddle

Inventor:
John Thomson
by Redding, Liddle & Greeley
Attys.

No. 771,337. PATENTED OCT. 4, 1904.
J. THOMSON.
DISK WATER METER.
APPLICATION FILED OCT. 19, 1903.
NO MODEL. 4 SHEETS—SHEET 4.

Attest: Inventor:

No. 771,337. Patented October 4, 1904.

UNITED STATES PATENT OFFICE.

JOHN THOMSON, OF NEW YORK, N. Y., ASSIGNOR TO NEPTUNE METER COMPANY, OF NEW YORK, N. Y., A CORPORATION OF NEW JERSEY

DISK WATER-METER.

SPECIFICATION forming part of Letters Patent No. 771,337, dated October 4, 1904.

Application filed October 19, 1903. Serial No. 177,624. (No model.)

*To all whom it may concern:*

Be it known that I, JOHN THOMSON, a citizen of the United States, residing in the borough of Manhattan, in the city of New York, in the county and State of New York, have invented certain new and useful Improvements in Disk Water-Meters, of which the following is a specification.

This invention relates to disk water-meters, and has for its object to increase the sensibility of registration at low rates of flow, to increase the endurance when operated at high rates of delivery, to minimize the damage, expense, and inconvenience should the meter be frozen, and in general to reduce the cost of construction and yet increase the life and effectiveness of this well-known type of water-meter.

Figure 1:
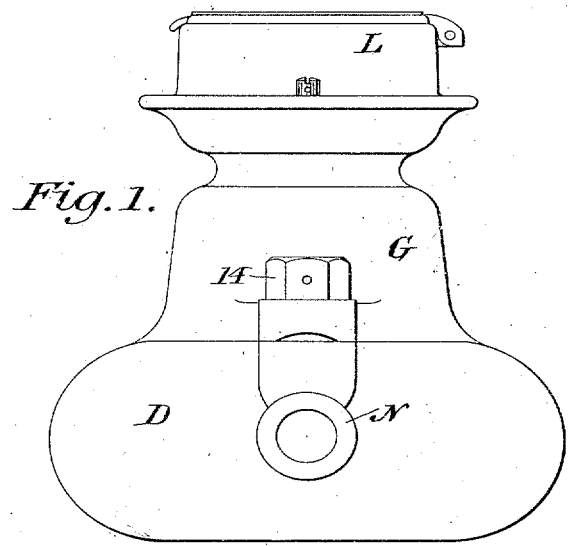
Figure 2:
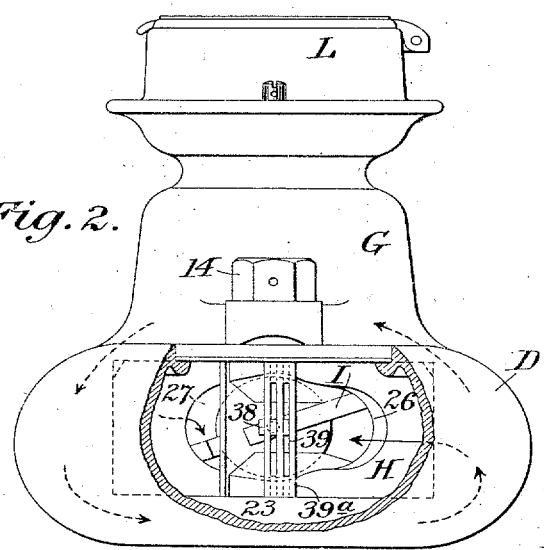
Figure 4:
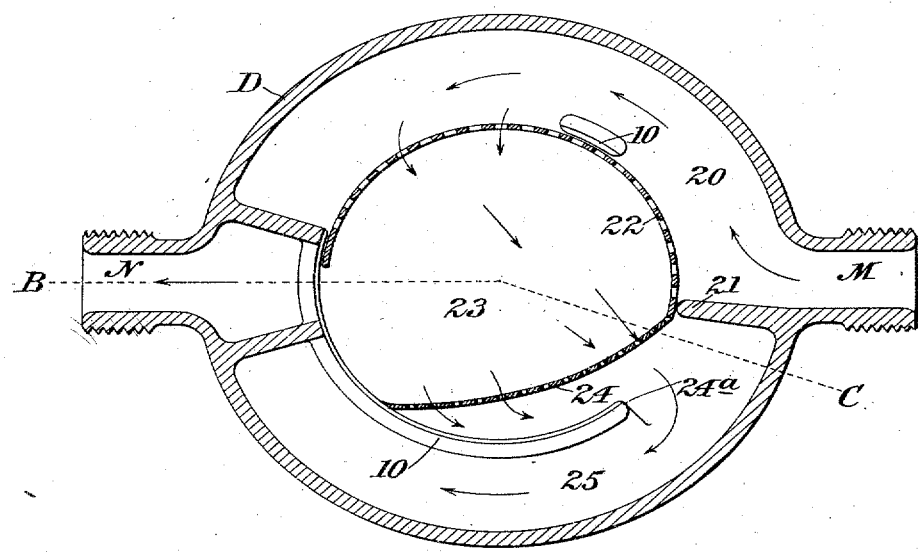
Figure 5:
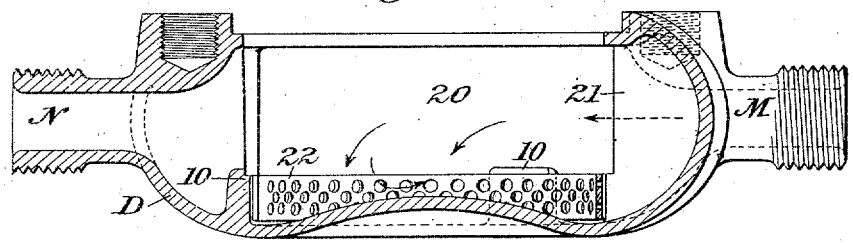
Figure 6:
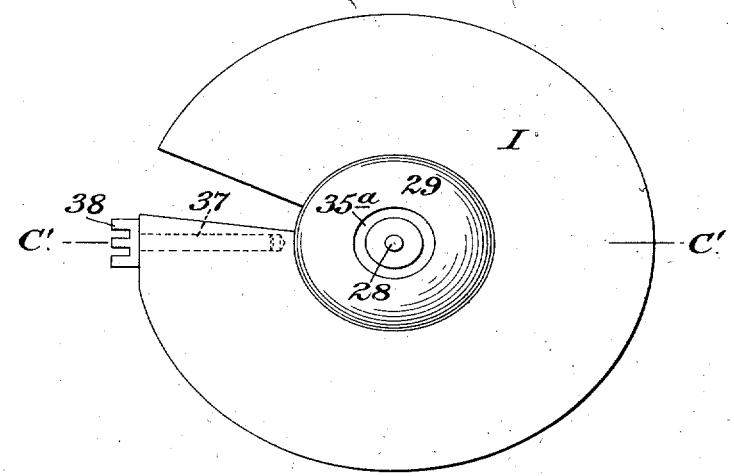
Figure 7:
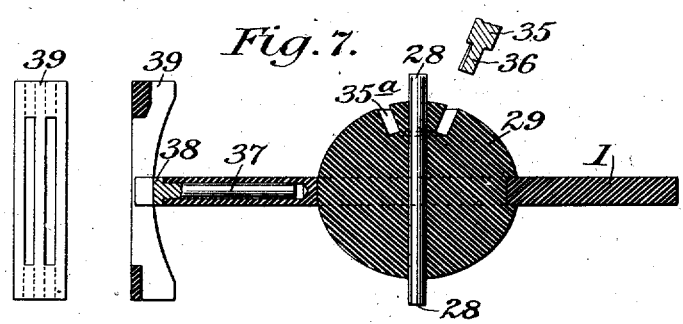

In the drawings, Figure 1 is an end elevation from the outlet-spud, showing the external contour of the meter in full lines. Fig. 2 is a view similar to that of Fig. 1, but having the outlet-spud and a portion of the external case-wall broken away to expose the disk-chamber casing with its ports and contained parts. Fig. 3 is a vertical center section of the meter through the inlet and outlet spuds, the external casings, and the disk-chamber casing. Fig. 4 is a horizontal center section of the lower external casing in the line A of Fig. 3. Fig. 5 is a vertical section of the lower external casing on the lines B C of Fig. 4. Fig. 6 is a detached plan view of the disk enlarged. Fig. 7 is a transverse center section of the disk on the line C' of Fig. 6, also showing additional allied parts to be hereinafter referred to; and Fig. 8 is an enlarged detached view of the stuffing-box spindle and its allied parts.

D denotes the lower external casing; G, the upper external casing; H, the disk-chamber casing; I, the disk; J, the internal reducing gear-train; K, the stuffing-box; L, the register-cover; M, the inlet-spud, and N the outlet-spud. These are the usual designations, and the various specific details will be hereinafter more specifically pointed out.

I will now explain the general features of my invention.

First. One feature of my invention relates to an improved disposal and construction of the main casings and the disk-casing to reduce the liability to injury in event of freezing. In this connection reference may be had to my Patent No. 520,197, beginning at page 2, line 70, and also to my Patent No. 602,377. These patents cover, broadly, a design of meter in which when an inclosing head at the bottom is blown out by the expansive action of freezing the inner measuring-case shall be free to follow the head and also to separate in two parts horizontally. In this wise the moving column of ice within the main casing acting against the top of the meter as an abutment will not disrupt or distort the more delicate and accurately-formed measuring-chamber. It is to be particularly noted that in the patents cited the inclosing head is at the bottom directly underneath and in close proximity to the measuring-chamber, the consequence of which is that these parts are located where the travel of the ice column is greatest. According to the invention herein set forth I place the disk-casing in the lower main casing and secure it against its seat 10 by the rim 12 of the upper main casing, which acts directly upon the interposed gasket 13, and in designing the two main casings so that the depth of each shall be approximately equal to the other. I then secure the two casings to each other by means of bolts or nuts, as 14 15, arranged by predetermined experiments to break, strip, automatically withdraw, or yield resiliently under a pressure considerably greater than that which the meter will ordinarily be subjected to, but well within the strength of the casings, one form of such nuts or bolts being shown in an application filed by me October 19, 1903, Serial No. 177,623, and having slots 15ª. The consequence of this arrangement and disposal is that the ice will be caused to flow in two directions—that is, from the top downwardly to the line of separation of the main casings and from the bottom up to the same line of separation. Thus the two main casings will be forced apart, the contained disk-chamber casing will be lifted from its seat, and its two sections 16 17 will be separated at their horizontal snap-joint 18. Therefore when the bolts yield the desirable result is that the disk-casing is caused to move upwardly and to an extent equal only to that of the expansion of the ice in the lower main casing. It is thus less liable to be cramped in its bearing and can be more easily and surely reset to its normal position.

Second. Another feature of my invention relates to the flow through the casings and the strainer. (Illustrated in Figs. 2, 3, 4, and 5.) The inflowing water is caused to pass into the semicircular chamber 20 by the rib or wall 21, thence downwardly through the semicircular strainer 22, situated below the disk-casing, thence across the inner space 23 through the flattened portion 24 of the strainer, through the opening 24$^a$ into the opposite semicircular chamber 25, next to the inlet-port 26, into and around the disk-chamber, and finally discharges through the outlet-port 27. The strainer is preferably made with relatively coarse openings in the portion 22 and smaller openings in the portion 24. In this wise foreign material of large caliber is retained in the outer chamber and material of smaller caliber in the intermediate chamber. Again, by thus directing the flow the water is caused to reach the inlet-port in the most favorable manner and with the least impact upon the disk and its ball.

Third. Another feature relates to the control of the oscillating action of the disk and to the means of transmitting its motion to the gear-train. These features are shown in Figs. 3 and 7. The disk I is maintained in contact with the conical frustums $r$ $s$ of the disk-casing by the spindle 28 operating above and below the ball 29 in the circular grooves 30 31, formed in the sockets 32 33. The motion of the disk is transmitted to the primary pinion 34 of the gear-train by the lower end of its spindle 35, which engages the circular groove 35$^a$, formed in the ball. Thus the grooves in the socket in which the ends of the disk-spindle gyrate are stationary, whereas the groove in the ball gyrates, thereby causing the pinion-spindle to revolve. The form of the end 36 of the pinion-spindle to obtain the best results is that of the section of a cone, as seen in Fig. 7. In this wise the spindle and its pinion are driven equally from both sides of opposite diameters, and thus does not impose any side thrust upon the bearing.

Fourth. Another feature relates to the control of the circular thrust of the disk—that is, the thrust due to the flow of water—hence loss of head in passing through the inlet-port and around the disk-chamber. This is, in fact, an improvement in detail of that of several of my previous patents of record and consists in providing a thrust-spindle 37, having a bearing in the disk, with a head 38, having a plurality of projections or prongs adapted to operate in a bearing-piece 39, having a corresponding number of slots. This bearing-piece is preferably situated within the bounds of the inlet-port in an open slot 39$^a$ in the perimeter of the disk-casing, the outer surfaces being flush. Hence when the disk-casing is inserted to its seat the bearing-piece is locked to place. The object of this construction is to provide in small compass a bearing having a large surface whereby to enduringly resist the high speed and considerable thrust-pressure which the action of the disk imposes. In this wise, too, the spindle is caused simply to rock axially within its bearing in the disk instead of making a number of complete revolutions, as in the instance of using a spindle having a round head acting as a roller in a single slot. The practical advantage thus derived is very important, and the bearing may be readily applied in meters of various sizes to meet the most severe conditions of operation.

Fifth. Another feature relates to the gear-train and consists in forming upon the top of the disk-chamber casing a finished circular plane surface 40 and a similar finished plane surface 41 upon the inner head of the upper main casing and making the spindles 42 43 of the gear-train without any shoulders, so that they cannot bear upon the gear-plates 44 45. Thus when the meter is assembled the ends of the gear-spindles will bear upon either the upper or the lower plane surfaces 40 41, as the case may be. The consequence of this is to obtain the least possible friction—that is, pivot-friction—and by the most simple and enduring means.

Sixth. Another feature relates to the stuffing-box and its spindle. The stuffing-box nut proper, 46, Figs. 3 and 8, which compresses the packing material, as 47, is $per$ $se$ of the usual construction, except that it in itself carries an additional nut 48, screwed to its upper end, and is provided with an inner recess 49. Then the stuffing-box spindle 50 is formed with a collar 51, adapted to operate within this recess, the lower end of the spindle having a flattened portion 52 adapted to engage the slot 53 of the final gear of the train. In this manner it will be observed that the outward thrust upon the spindle—that due to the internal pressure of the water—is resisted outside of the pressure-chamber and in a recess which is readily capable of being lubricated. Again, by unscrewing the upper nut 48 the spindle may be withdrawn, and the degree of friction produced by compressing the packing may be manually tested. So, too, the downward thrust upon the spindle when applying the change-gear 54, which connects with the register, is taken upon the shoulder instead, as heretofore, of being transmitted to the internal gears. In the adjustment of meters for the very lowest rates of indication this feature is of great importance in that it enables the operator to know with certainty whether the packing has been suitably applied to obtain a water-tight joint with the least possible resistance to the revolution of the spindle.

In the claims hereinafter following I use the term "yielding" to include all sorts of yielding or bending, deflection and retroaction, and all sorts of breaking or fracture.

I claim—

1. In a disk water-meter the combination of two external casings, each of approximately the same depth, the lower containing a disk mounted in a disk-casing which is separable horizontally the external casings and the disk-casing being held to their normal operative positions by external means adapted to yield under less pressure than the said external casings, whereby if frozen the casings will separate, causing the ice to flow in two directions and carrying the disk-casing in separated sections, with one of the flowing ice volumes, substantially as and for the purpose set forth.

2. In a disk water-meter the combination with the lower external casing and the disk-casing of a strainer, situated below the disk-casing, one portion of said strainer having perforations larger than the other portion and said strainer being arranged to form two distinct receptacles for the retention of foreign substances of different calibers, substantially as described and for the purpose specified.

3. In a disk water-meter the combination with the lower external casing and the disk-casing of the rib 21 and a strainer below the disk-casing and held in place thereby the said several parts being constructed and arranged so that the inflowing water is deflected sidewise to a circular chamber, as 20, thence downwardly to pass through the strainer, thence through a port, 24", to the opposite circular chamber, as 25, and thence to the disk-chamber, substantially as and for the purpose set forth.

4. In a disk water-meter the combination with the gear-train of the disk-casing, the disk, the ball and the ball-sockets, recesses in said sockets, a spindle acting in said recesses to control the disk with respect to its oscillation, and a circular recess formed in the ball and adapted to engage and rotate the primary spindle of the gear-train, substantially as described.

5. In a disk water-meter the combination with the gear-train of the disk-casing, the disk, the ball and the ball-sockets, recesses in said sockets, a spindle acting in said recesses to control the disk with respect to its oscillation and a circular recess formed in the ball and adapted to engage and rotate the primary spindle of the gear-train, the form of the engaging end of said primary spindle being the section of a cone, substantially as and for the purpose set forth.

6. In a disk water-meter the combination of the gear-train and the disk-casing, the lower pivot-points one of the gear-spindles being arranged and adapted to bear upon a plane surface formed upon the upper face of the disk-casing, substantially as described.

7. In a disk water-meter the combination of the gear-train, the disk-casing and the upper external casing, the upper pivot-points one of the gear-spindles being arranged and adapted to bear upon a plane surface formed upon the inner face of the head of the external casing, substantially as described.

8. In a disk water-meter the combination of the gear-train, the disk-casing and the external casing, the upper and the lower pivot-points respectively being arranged and adapted to bear upon a plane surface formed upon the upper face of the disk-casing and the lower face of the head of the external casing, respectively, substantially as described.

9. In a disk water-meter the combination with the disk-casing and the disk therein of the thrust-spindle mounted in the disk, having a head with a plurality of slots, and a slotted bearing-piece mounted in the disk-casing, within which the slotted head operates to receive and control the circular thrust of the disk, substantially as described.

10. In a disk water-meter the combination with the disk-casing having a slotted bearing and the disk therein of a spindle mounted in the edge of the disk, said spindle being adapted to vibrate axially and having a projecting head with a plurality of prongs arranged to slide up and down in the slotted bearing in the disk-casing, substantially as described.

11. In a disk water-meter, the combination with the internal casing the disk-casing, the thrust-spindle and the disk of the slotted bearing-piece mounted in the disk-casing to coöperate with the thrust-spindle of the disk, said slotted bearing-piece being adapted to be secured to its place by the insertion of the disk-casing into its seat in the external casing, substantially as described.

12. In a disk water-meter the stuffing-box nut, composed of two separable parts in combination with the stuffing-box spindle having an enlargement operating in a recess formed by the said two parts, as and for the purpose set forth.

13. In a disk water-meter the combination with a central stud carried by the upper external casing, the stuffing-box spindle passing through said stud and provided with a collar or shoulder, a divided nut secured to said stud forming a recess within which said collar or shoulder operates, substantially as and for the purpose set forth.

In a disk water-meter the combination with the external casing of the disk-casing, a strainer situated below the disk-casing having a semicircular portion and a flattened portion, the semicircular portion of said strainer having perforations larger than the flattened portion of said strainer, said strainer being arranged to form two distinct receptacles for the retention of foreign substances of different calibers, substantially as and for the purpose set forth.

15. In a disk water-meter the combination with the gear-train of the disk-casing, the disk, the ball and the ball-sockets, recesses in said sockets, a spindle acting in said recesses to control the disk with respect to its oscillations, a recess in the upper side of the ball and means for transmitting motion from the disk to the gear-train actuated by the recess in the ball, substantially as and for the purpose set forth.

16. In a disk water-meter the combination with the disk-casing, the disk, the ball and the ball-sockets above and below the ball, of recesses in each of said sockets and a spindle acting in said recesses to control the oscillating action of the disk, substantially as and for the purpose set forth.

17. In a disk water-meter the combination with a stuffing-box and the stuffing-box spindle, of means located outside of the pressure-chamber and connected to but outside of the stuffing-box to resist the outward thrust upon the spindle due to the internal pressure of the fluid within the meter, substantially as and for the purpose set forth.

This specification signed and witnessed this 5th day of October, A. D. 1903.

JOHN THOMSON.

In presence of—
ALFRED W. KIDDLE,
A. N. JESBERA.

---

Corrections in Letters Patent No. 771,337.

It is hereby certified that in Letters Patent No. 771,337, granted October 4, 1904, upon the application of John Thomson, of New York, N. Y., for an improvement in "Disk Water-Meters," errors appear in the printed specification requiring correction, as follows: On page 3, line 68, the word *of* should be inserted before the word "one," and on same page, line 75, the word *of* should be inserted before the word "one"; and that the said Letters Patent should be read with these corrections therein that the same may conform to the record of the case in the Patent Office.

Signed and sealed this 8th day of August, A. D., 1905

[SEAL.]

F. B. MOORE,
*Acting Commissioner of Patents.* ing perforations larger than the flattened portion of said strainer, said strainer being arranged to form two distinct receptacles for the retention of foreign substances of different calibers, substantially as and for the purpose set forth.

15. In a disk water-meter the combination with the gear-train of the disk-casing, the disk, the ball and the ball-sockets, recesses in said sockets, a spindle acting in said recesses to control the disk with respect to its oscillations, a recess in the upper side of the ball and means for transmitting motion from the disk to the gear-train actuated by the recess in the ball, substantially as and for the purpose set forth.

16. In a disk water-meter the combination with the disk-casing, the disk, the ball and the ball-sockets above and below the ball, of recesses in each of said sockets and a spindle acting in said recesses to control the oscillating action of the disk, substantially as and for the purpose set forth.

17. In a disk water-meter the combination with a stuffing-box and the stuffing-box spindle, of means located outside of the pressure-chamber and connected to but outside of the stuffing-box to resist the outward thrust upon the spindle due to the internal pressure of the fluid within the meter, substantially as and for the purpose set forth.

This specification signed and witnessed this 5th day of October, A. D. 1903.

JOHN THOMSON.

In presence of—
ALFRED W. KIDDLE,
A. N. JESBERA.

---

Corrections in Letters Patent No. 771,337.

It is hereby certified that in Letters Patent No. 771,337, granted October 4, 1904, upon the application of John Thomson, of New York, N. Y., for an improvement in "Disk Water-Meters," errors appear in the printed specification requiring correction, as follows: On page 3, line 68, the word *of* should be inserted before the word "one," and on same page, line 75, the word *of* should be inserted before the word "one"; and that the said Letters Patent should be read with these corrections therein that the same may conform to the record of the case in the Patent Office.

Signed and sealed this 8th day of August, A. D., 1905

[SEAL.]

F. B. MOORE,
*Acting Commissioner of Patents.*

It is hereby certified that in Letters Patent No. 771,337, granted October 4, 1904, upon the application of John Thomson, of New York, N. Y., for an improvement in "Disk Water-Meters," errors appear in the printed specification requiring correction, as follows: On page 3, line 68, the word *of* should be inserted before the word "one," and on same page, line 75, the word *of* should be inserted before the word "one"; and that the said Letters Patent should be read with these corrections therein that the same may conform to the record of the case in the Patent Office.

Signed and sealed this 8th day of August, A. D., 1905

[SEAL.]

E. B. MOORE,
*Acting Commissioner of Patents.*